(12) United States Patent
Walter

(10) Patent No.: US 7,514,164 B2
(45) Date of Patent: Apr. 7, 2009

(54) FUEL CELL SYSTEM INCLUDING A FUEL CELL STACK AND AT LEAST ONE ELECTRICAL ENERGY STORAGE DEVICE

(75) Inventor: Markus Walter, Dettingen (DE)

(73) Assignee: Daimler AG, Stuttgart (DE)

( * ) Notice: Subject to any disclaimer, the term of this patent is extended or adjusted under 35 U.S.C. 154(b) by 819 days.

(21) Appl. No.: 11/030,533

(22) Filed: Jan. 6, 2005

(65) Prior Publication Data

US 2005/0175876 A1     Aug. 11, 2005

(30) Foreign Application Priority Data

Jan. 8, 2004    (DE) ................. 10 2004 001 298

(51) Int. Cl.
  *H01M 16/00*     (2006.01)
  *H01M 8/04*      (2006.01)
(52) U.S. Cl. .................... 429/9; 429/24; 429/26
(58) Field of Classification Search ............. 429/9, 429/24, 26; 320/101
  See application file for complete search history.

(56) References Cited

U.S. PATENT DOCUMENTS

| 4,081,693 | A | 3/1978 | Stone |
| 6,215,272 | B1 | 4/2001 | Ohara et al. |
| 7,078,116 | B2 * | 7/2006 | Enjoji et al. .................. 429/13 |
| 2002/0182454 | A1 | 12/2002 | Autenrieth et al. ............. 429/9 |
| 2003/0022031 | A1 | 1/2003 | Manery |
| 2003/0118876 | A1 | 6/2003 | Sugiura et al. |
| 2006/0269807 | A1 * | 11/2006 | Fujita et al. .................... 429/26 |

FOREIGN PATENT DOCUMENTS

| DE | 101 25 106 | 12/2002 |
| GB | 1 437 888 | 6/1976 |

* cited by examiner

*Primary Examiner*—Stephen J. Kalafut
(74) *Attorney, Agent, or Firm*—Davidson, Davidson & Kappel, LLC

(57) ABSTRACT

A fuel cell system includes a fuel cell stack and at least one electrical energy storage device that can be electrically connected to and/or disconnected from the fuel cell stack by at least one electronic switching element which is based, for example, on a MOSFET. The fuel cell stack itself is cooled. The at least one switching element is in thermally conductive contact with a cooling circuit for cooling the fuel cell stack, for example, by mounting the switching element on the end plates of the fuel cell stack.

12 Claims, 2 Drawing Sheets

FUEL CELL SYSTEM INCLUDING A FUEL CELL STACK AND AT LEAST ONE ELECTRICAL ENERGY STORAGE DEVICE

Priority is claimed to German Patent Application No. DE 10 2004 001 298.9, filed on Jan. 8, 2004, the entire disclosure of which is incorporated by reference herein.

The present invention relates to a fuel cell system having a fuel cell stack and at least one electrical energy store device.

BACKGROUND

A fuel cell system of this type is known from German Patent Application DE 101 25 106 A1. The fuel cell system described there has a preferably electronic switch that allows a switched current flow to be drawn from the fuel cell.

In this connection, the fuel cell is controlled in such a manner that when a critical threshold is reached, such as a minimum voltage, a critical pressure, a predetermined internal resistance, or the like, the switch interrupts the current from the fuel cell in order that the voltage at the individual cells or at one of the individual cells cannot fall below a damaging threshold. Typically, such a damaging threshold is at a cell voltage of 0 volts. While the current flow from the fuel cell is interrupted, the loads are supplied with energy from the electrical energy storage device, here a combination of a battery and a high-performance capacitor. Pulse-width modulated switching, in particular at high frequencies, places very high demands on the switching element itself because the currents generally have to be switched while the system is under load, and because the internal resistance of the switching element should be kept as low as possible to prevent high power dissipation.

These requirements can be achieved by using semiconductor switches, for example in the form of metal-oxide semiconductor based field-effect transistors, so-called MOSFETs. Because these MOSFETs allow extremely short switching times, even under load, it is possible to achieve high pulse-width modulation frequencies combined with moderate power dissipation. In addition, such MOSFETs can cope with extremely high current surges, such as typically occur when using low-resistance intermediate storage devices such as the above-described high-performance capacitor.

In spite of the comparatively moderate power dissipation of such electronic switches, there is still a comparatively large amount of heat generated by the power losses because of the high currents and high powers. In this already very complex fuel cell system, it is a serious disadvantage if special provisions have to be made to dissipate this power loss which manifests itself as thermal energy.

Moreover, especially in fuel cell systems that obtain the hydrogen they need from gas generation systems, the ambient temperature of the electronic switches will be comparatively high, which makes convection cooling with generally used cooling elements or heat sinks even more difficult.

SUMMARY OF THE INVENTION

It is an object of the present invention to provide a fuel cell system that avoids the above-mentioned disadvantages and optimizes the usability of electronic switches in fuel cell systems having a fuel cell stack and at least one electrical energy store device.

The present invention provides a fuel cell system that includes a fuel cell stack and at least one electrical energy storage device that can be electrically connected to and/or disconnected from the fuel cell stack by at least one electronic switching element; the fuel cell stack being cooled, wherein at least one of the switching elements (8) is in thermally conductive contact with a cooling circuit (3) for cooling the fuel cell stack (2).

By thermally coupling the switching elements to the cooling system, which exists in a fuel cell stack, for example, based on PEM fuel cells, anyway, the existing cooling circuit can also be used for cooling the electronic switching elements. In this connection, the cooling of the fuel cell stack by the cooling circuit will typically be designed as an active and controlled cooling system. For example, in the case of a PEM fuel cell stack, the temperatures are controlled to approximately 70 to 90° C. with a tolerance of ±1° C. to maintain its functionality. Since the generally used electronic switching elements based on semiconductor devices can also cope very well with this range of temperatures, the cooling circuit can therefore provide both the cooling of the fuel cell stack and the cooling of the power electronic components.

In one particularly advantageous embodiment of the present invention, it is proposed that the switching element be designed as a semiconductor device including at least one switch. In one very advantageous refinement, this switch can be designed as a metal-oxide semiconductor based field-effect transistor (MOSFET), in particular as an N-channel MOSFET. The advantage of such MOSFETs lies in the already mentioned extremely short switching times, even under load, combined with moderate power dissipation across the internal resistance of the MOSFETs, as well as in the fact that very high switching frequencies can be achieved using a MOSFET. Moreover, the use of N-channel MOSFETs has the well-known advantage that N-channel semiconductor devices have a lower internal resistance than corresponding P-channel devices. In principle, however, the use of P-channel MOSFETs would also be conceivable.

Moreover, one very advantageous embodiment of the fuel cell system according to the present invention proposes that at least two of the MOSFET-based switching elements for electrically disconnecting and/or connecting the fuel cell stack and the at least one energy storage device be interconnected antiserially.

This type of interconnection has the particular advantage that when the electrical connection is disconnected, the antiserial interconnection of the MOSFETs provides a "real" electrical separation between the fuel cell stack and the at least one energy storage device. In an antiserial interconnection, the disadvantage of the typically existing substrate diode of the MOSFETs can be eliminated. This is because, due to the antiserial interconnection, current flow is reliably blocked in both directions when the MOSFETs are disabled. The connection between the fuel cell stack and the at least one energy storage device is electrically disconnected in a bipolar manner, i.e., in both directions, so that no currents can flow from the fuel cell to the at least one energy storage device, or from the energy storage device toward the fuel cell, which is more important for preventing damage to the fuel cell.

In a very advantageous refinement of fuel cell system according to the present invention, the at least one switching element is mounted on at least on end plate of the fuel cell stack in electrically and thermally conductive contact therewith.

In addition to the direct thermal coupling of the switching element to the cooled fuel cell stack or to the also cooled end plates thereof, this provides ideal cooling of the switching element as well as its electrical connection to the fuel cell stack. Due to the fact that comparatively large currents of up to several hundred amperes flow here, a considerable advantage in terms of complexity, assembly, space and costs can be achieved by eliminating the need for an otherwise required electrical connecting line.

When the thermal energy resulting from the power loss in the region of the switching elements is input into the end-plate region of the fuel cell stack, there is the additional advantage that the temperature in this region of the fuel cell stack is usually slightly lower than in the middle of the fuel cell stack anyway. So the thermal connection between the switching element and the end plate of the fuel cell stack provides efficient cooling of the switching element, on the one hand, and heating of the peripheral area of the fuel cell stack on the other hand. Thus, the entire fuel cell stack has a more uniform temperature across all areas, making possible a more uniform operation of all fuel cells in the fuel cell stack. In the final analysis, therefore, better performance of the fuel cell stack can be expected.

BRIEF DESCRIPTION OF THE DRAWINGS

Further advantageous embodiments of the present invention will become apparent from the remaining dependent claims and from the exemplary embodiment described below with reference to the drawing, in which:

DETAILED DESCRIPTION

Figure 1:
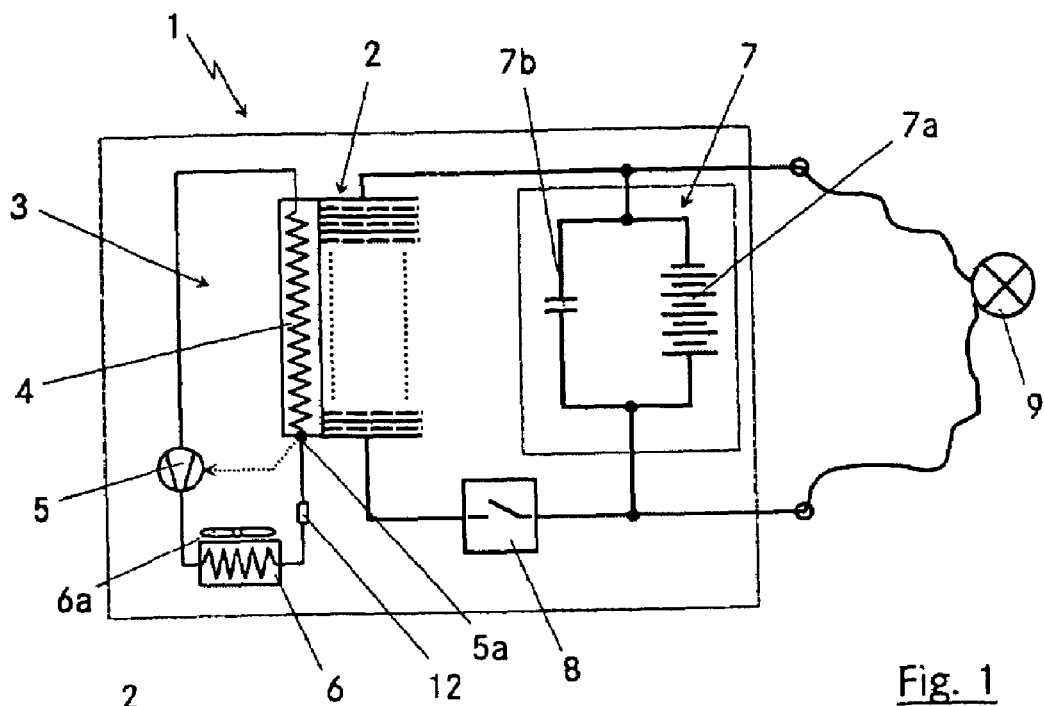
FIG. 1 shows a fuel cell system.

FIG. 1 shows a fuel cell system 1 including a fuel cell stack 2 (symbolically depicted here) which can, for example, take the form of a PEM fuel cell stack. This fuel cell stack 2 is composed of a plurality of serially interconnected fuel cells. Besides, the fuel cell stack may include several such substacks, which would then be connected in parallel to each other. The following embodiments will each be described with reference to a single fuel cell stack 2; however, they can be used analogously for a plurality of fuel cell stacks connected in parallel.

Fuel cell stack 2 is cooled by a cooling circuit 3, in which a liquid coolant, such as a water/antifreeze mixture, is circulated. In addition to a cooling heat exchanger 4 located in fuel cell stack 2, cooling circuit 3 includes a pumping device 5 and a cooling heat exchanger 6 for dissipating the thermal energy in the coolant to the ambient environment. This cooling circuit 3 actively cools fuel cell stack 2 to a predetermined temperature, usually in a range between 70 and 90° C. This active cooling of fuel cell stack 2 is performed with very high accuracy because the fuel cells of fuel cell stack 2 preferably operate with a very small temperature variation, preferably on the order of ±1 to 2 K. For cooling control, cooling circuit 3 is provided with a suitable sensor 5a, here indicated in the region where the coolant enters heat exchanger 4. The coolant flow is then controlled based on the data acquired by this sensor and, possibly, as a function of the ambient temperature of cooling heat exchanger 6, for example, using a controllable coolant pumping device, as indicated here by the dotted arrow, and/or a valve device for controlling the rate of coolant flow, and/or a fan 6a in the area of cooling heat exchanger 6.

Fuel cell system 1 also includes suitable devices for supplying the operating media, for example, hydrogen or hydrogen-rich reformate gas and air. These devices are known per se and are, therefore, not shown here. Moreover, the fuel cell system 1 shown here includes an energy storage device 7, which can be electrically connected to and/or disconnected from the fuel cell by at least one electronic switching element 8. Such a design of a fuel cell system 1, as known from the prior art, is used for supplying electric power to an electrical load 9 indicated here. The fuel cell system 1 shown here is suitably controlled by drawing current from fuel cell stack 2 via switching element 8 in a switched, pulse-width modulated manner. In this connection, load 9 is always connected to energy storage device 7, and when switching element 8 is closed, it is also connected to fuel cell stack 2 so that when switching element 8 is open, the power for electrical load 9 can be drawn from energy storage device 7. Thus, fuel cell system 1 allows continuous power supply to electrical load 9, provided that fuel cell stack 2 and the starting materials fed thereto are used in an ideal manner.

Energy storage device 7 can consist of a battery 7a, but as shown here, it can also be made up of a battery 7a and a capacitor 7b connected in parallel; the capacitor having a considerably lower internal resistance than battery 7a. A design of this kind is described with all its possible embodiments and advantages in the German Patent Application DE 101 25 106 A1 mentioned at the outset.

Figure 2:
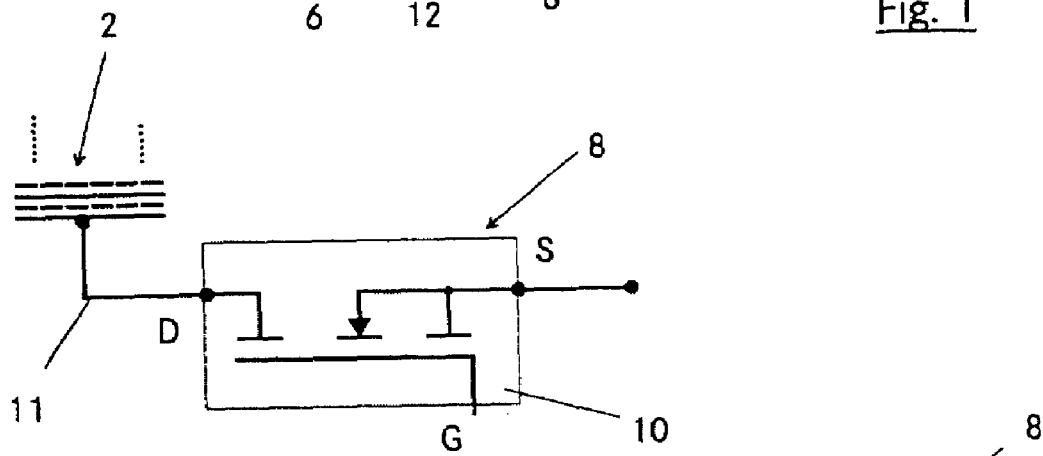
FIG. 2 shows a MOSFET as an electrical switching element.

In FIG. 2, switching element 8 is shown again in a possible interconnection configuration. In this representation, switching element 8 has a switch designed as a metal-oxide semiconductor based field-effect transistor, a so-called MOSFET 10. In principle, a single MOSFET 10 would be sufficient as a switch in switching element 8. However, to achieve a design having as low a resistance as possible when in the enabled condition, it is also possible to use a plurality of paralleled MOSFETs 10 as a switch in switching element 8. In addition to achieving a low-resistance connection in the enabled condition, it can thereby also be achieved that a plurality of smaller MOSFETs 10 are used, which ultimately increases the total area occupied by MOSFETs 10. This increased area provides improved cooling of MOSFETs 10 since the MOSFETs are cooled via the substrate surface, which typically also constitutes the drain terminal D. In the exemplary embodiment shown in FIG. 2, drain D of MOSFET 10 is connected to fuel cell stack 2, for example, to the end plate on the anode side thereof. This connection, which, by way of example, is indicated in FIG. 2 by line 11, is ideally accomplished by mounting the MOSFET, and thereby its substrate, i.e., drain terminal D, directly on the end plate. By mounting MOSFET 10 directly on the end plate of fuel cell stack 2, which in the configurations generally used for fuel cell stacks 2 also constitutes one electric pole thereof, switching element 8 is thermally and electrically coupled to fuel cell stack 2 in an ideal manner. Thus, a design which is ideal in terms of the electrical and thermal coupling of switching element 8 can be achieved with minimum effort and without the need for a connecting line for the currents of several hundred amperes typically flowing in this area.

MOSFET 10 is controlled by a control voltage which is applied in the region of gate G of MOSFET 10, for example, by an open-loop and/or closed-loop control electronics system, thereby enabling the connection between drain D and source S for a flow of current.

Instead of the direct thermal connection of switching element 8 to the end plate of fuel cell stack 2, it would also be conceivable to bring switching element 8 into contact with the coolant flowing in cooling circuit 3; the region which is marked 12 in FIG. 1 and is located upstream of the coolant entry into the heat exchanger being suitable for this purpose.

The power that is dissipated by switching element 8 and needs to be cooled is so low that it does not heat the coolant to an extent that would negatively affect the cooling of fuel cell stack 2 by heat exchanger 4. On the other hand, before the coolant enters fuel cell stack 2, i.e., heat exchanger 4, it is noticeably cooler than after leaving the same so that ideal cooling of switching element 8 by coolant 3 can be ensured in this region 12 because of the higher temperature difference.

Figure 3:
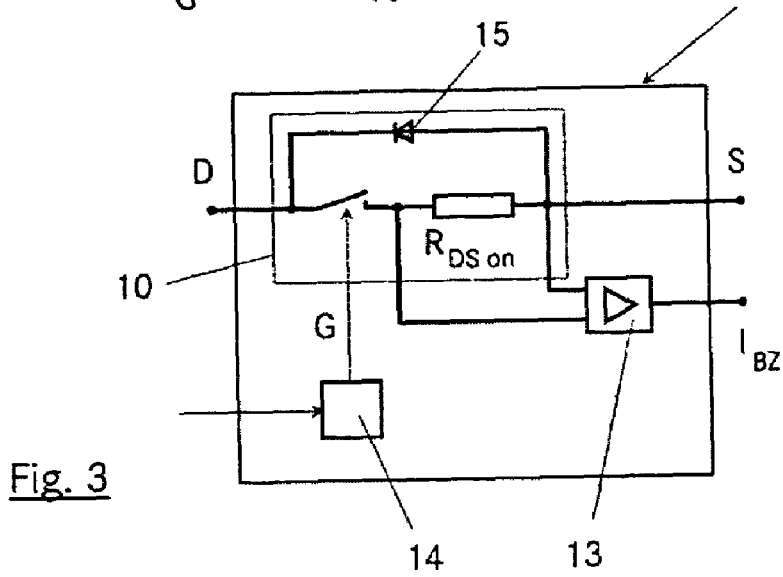
FIG. 3 is a schematic circuit diagram of such a switching element.

In addition to this simplest embodiment of switching element 8 shown in FIG. 2, it is also conceivable to integrate further electronic components in the area of switching element 8. In FIG. 3, such a switching element 8 is depicted again, with MOSFET 10 being shown in the form of its equivalent circuit diagram. In addition to MOSFET 10, which, as described earlier, can also be made up of a plurality of MOSFETs connected in parallel, switching element 8 as embodied in FIG. 3 includes a device for measuring and amplifying the voltage drop across the internal resistance $R_{DS\,on}$ of the enabled MOSFET or MOSFETs 10. MOSFETs 10 typically have a known internal resistance $R_{DS\,on}$, when in the enabled condition. This internal resistance is only a few mΩ, but the very high currents that are switched in the case described here give rise to a perfectly measurable voltage drop, which can be amplified by a suitable amplifying device 13, such as an operational amplifier, and used as a measurement signal for the current $I_{BZ}$ drawn from fuel cell stack 2. The measurement of the fuel cell current using the voltage drop across internal resistance $R_{DS\,on}$ of MOSFET 10 can be achieved to about ±5 to 10% of the actual fuel cell current $I_{BZ}$ so that this value is perfectly sufficient for many control tasks, such as safety shutdowns, or the like. A different sensory system involving more complexity and additional costs can then be dispensed with.

Moreover, the representation of switching element 8 according to FIG. 3 shows an integrated circuit 14 which supplies the control voltage to gate G of MOSFET 10. The incorporation of such a circuit 14, which in turn can be driven by an open-loop and closed-loop control electronics system as indicated by the dotted arrow, offers the advantage that this component, on the one hand, is also cooled and, on the other hand, that, being incorporated in switching element 8, it facilitates the control of MOSFET 10.

A further special feature of MOSFETs 10 is apparent from the equivalent circuit diagram used for the MOSFET in FIG. 3. Since MOSFET 10 is built as a metal-oxide semiconductor based device, MOSFET 10 also has a diode effect 15 acting in the manner of a free-wheeling diode. This "free-wheeling diode" can give rise to a current flow through MOSFET 10 from source S to drain D, here, for example, from energy storage device 7 toward fuel cell stack 2, even when no control voltage is applied to the gate of MOSFET 10; this current flow possibly being capable of negatively affecting and/or damaging the fuel cell stack. The Figures below therefore show suitable designs that are capable of providing a "real", i.e., bipolar separation between fuel cell stack 2 and energy storage device 7.

Figure 4:
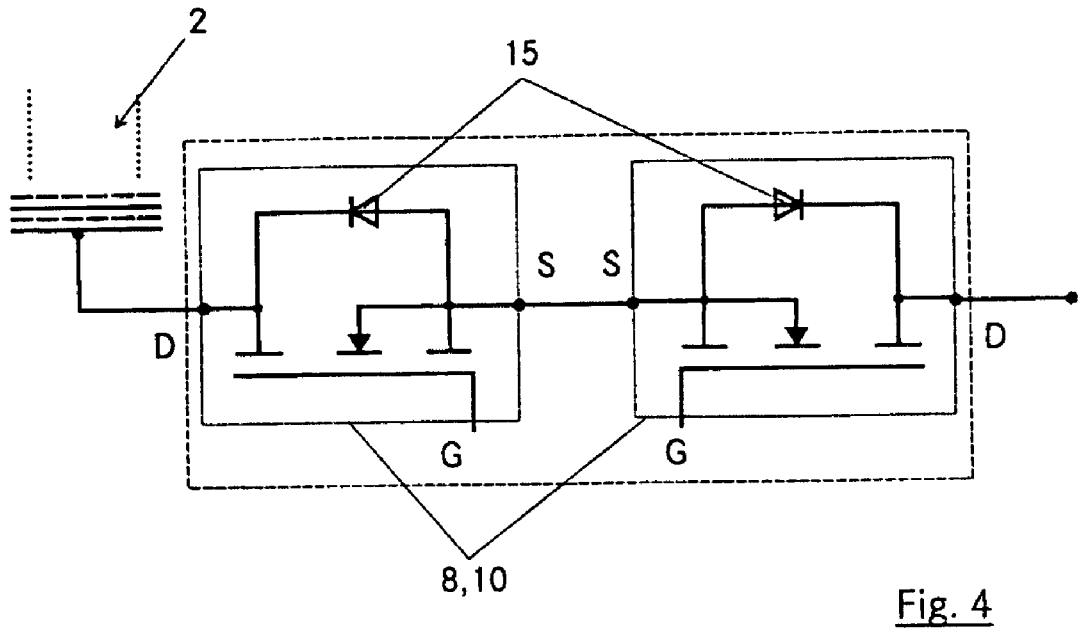
FIG. 4 shows an option for antiserial interconnection of switching elements.

FIG. 4 shows a design in which two of the switching elements 8 are antiserially interconnected in the manner described above. Both switching elements 8 are located on one side of fuel cell stack 2, and are electrically connected thereto or to one of the end plates thereof. The two switching elements 8 are interconnected in such a manner that the source terminals S of their MOSFETs are connected together. In this manner, the diodes 15 contained in MOSFETs 10 are interconnected antiserially so that current flow through the series combination of the two switching elements 8 is only possible when a control voltage is applied to gates G. For cooling, two different approaches are possible here. First of all, it is again possible to connect drain D, and thereby typically the substrate of one MOSFET 10, i.e., of one switching element 8, directly to the end plate. However, the other MOSFET 10, i.e., the other one of switching elements 8, must be mounted such that it is electrically isolated. It can then be cooled by cooling circuit 3, for example, in the above-described region 12 thereof. Moreover, it is also conceivable to cool both MOSFETs 10, i.e., switching elements 8, together by cooling circuit 3. This design allows gates G of the individual switching elements 8 to be driven in a very simple manner, as they are mutually controlled.

In principle, of course, the design can also be such that the two drain terminals D of switching elements 8 are connected. By directly connecting drain terminals D, and thereby typically the substrates of MOSFETs 10, cooling can be provided in a simple manner; it being preferred here for the cooling to take place in region 12 of cooling circuit 3 in the manner described above.

Figure 5:
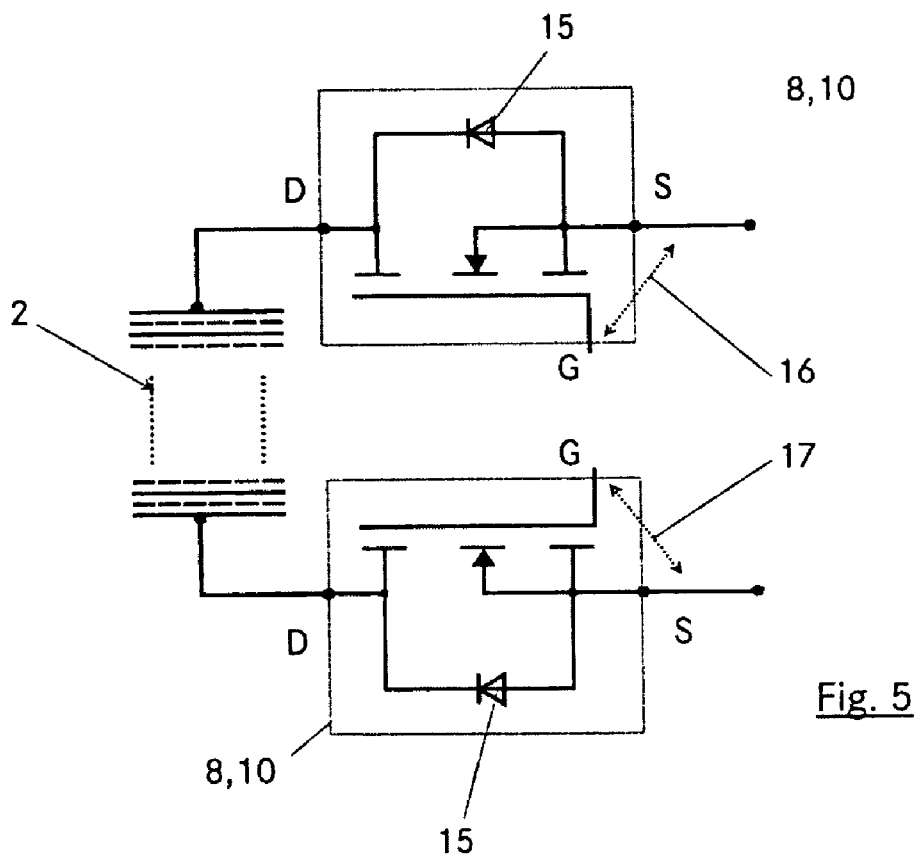
FIG. 5 shows an alternative for antiserial interconnection of switching elements.

FIG. 5 shows another embodiment of the design, in which, also, two of the switching elements 8 are used, which are interconnected antiserially. Here, in contrast to the exemplary embodiment described above, switching elements 8 are not directly interconnected, but one of switching elements 8 is located on one side of fuel cell stack 2 while the other is located on the other side of fuel cell stack 2. Using this design, the drains D of MOSFETS 10 of the two switching elements 8, and thereby the large-area substrates thereof, can be mounted on the two end plates of fuel cell stack 2, respectively, without electrical or thermal isolation. Then, one end plate, which forms the cathode, is in direct electrical and thermally conductive contact with one of switching elements 8, i.e., with drain D of its MOSFET 10. The other end plate of fuel cell stack 2, which is connected to the anode, is in equally direct thermal and electrical contact with drain terminal D of the MOSFET 10 of the other switching element 8.

Again, this design constitutes an antiserial interconnection with respect to the diodes 15 inherent in the MOSFETS 10 illustrated here so that here, too, an electrical connection and current flow are only possible when a control signal is applied to the gates G of the MOSFETs 10 of both switching elements 8.

Here, as indicated by the two arrows 16, 17, gates G are no longer driven together but separately. To this end, the integrated circuit 14 incorporated into the respective switching element 8 in the manner explained with reference to FIG. 3 generates a local control signal, for example, in response to an external trigger (for example, pulse) from an open-loop and/or closed-loop control electronics system. The advantage over the system described above is the direct thermal and electrical coupling to the end plates of fuel cell stack 2 which, moreover, provides thermal energy input to an area of fuel cell stack 2, in which this thermal energy is very beneficial for balancing and harmonizing the temperature profile across the entire fuel cell stack.

This certainly outweighs the disadvantage of the slightly more complex control of the MOSFETs 10 of switching elements 8 as compared to the embodiment according to FIG. 4.

Of course, all switching elements 8 shown here can be designed as exemplified in FIG. 3 and, in addition to a possibly larger number of paralleled MOSFETs 10, they can be provided with suitable devices for measuring fuel cell current $I_{BZ}$, as well as with suitable circuits 14 for generating the control signal for the gates G of MOSFETs 10. However, they could also be designed as a single MOSFET or as a differently constructed electronic switch without affecting the underlying mode of operation; the antiserial interconnection being, of course, suitably usable only in the case of MOSFETs.

What is claimed is:

1. A fuel cell system comprising:
   a fuel cell stack;
   at least one electrical energy storage device;
   a cooling circuit cooling the fuel cell stack; and
   at least one electronic switching element in thermally conductive contact with the cooling circuit and configured to electrically connect the electrical energy storage device to and/or electrically disconnect the electrical energy storage device from the fuel cell stack.

2. The fuel cell system as recited in claim 1, wherein the at least one switching element is a semiconductor switching element including at least one switch.

3. The fuel cell system as recited in claim 2, wherein the at least one switch is a metal-oxide semiconductor based field-effect transistor ("MOSFET").

4. The fuel cell system as recited in claim 3, wherein the at least one switch is an N-channel MOSFET.

5. The fuel cell system as recited in claim 3, wherein the at least one switching element measures a voltage drop across an internal resistance of at least one MOSFET.

6. The fuel cell system as recited in claim 3, wherein the at least one switching element includes at least two switching elements, each including at least one MOSFET and interconnected antiserially.

7. The fuel cell system as recited in claim 1, wherein the at least one switching element includes at least one electronic switch and a circuit arrangement configured to control the at least one electronic switch.

8. The fuel cell system as recited in claim 3, wherein the at least one switching element includes at least one electronic switch and a device for measuring and amplifying a voltage drop across an internal resistance of the electronic switch.

9. The fuel cell system as recited in claim 1, wherein the at least one switching element includes a plurality of electronic switches connected in parallel.

10. The fuel cell system as recited claim 1, wherein fuel stack includes at least one end plate and wherein the at least one switching element is mounted on at least the end plate and is electrically and thermally conductive contact with the end plate.

11. The fuel cell system as recited in claim 10, wherein the at least one electrical energy storage device includes an anode and a cathode, wherein the fuel stack includes a first end plate connected to the anode and a second end plate connected to the cathode, and wherein the at least one switching element includes a first and a second switching element, the first switching element being mounted on the first end plate and the second switching element being mounted on the second end plate.

12. The fuel cell system as recited in claim 1, wherein the cooling circuit includes a coolant entering the fuel cell stack at a coolant entry region, and wherein the at least one switching element is in thermally conductive contact with the coolant at a point upstream of the coolant entry region.

* * * * *